March 14, 1939.  V. G. GARNETT ET AL  2,150,322
DUAL WHEEL SPRING MOUNTING
Filed Nov. 2, 1937  2 Sheets-Sheet 1
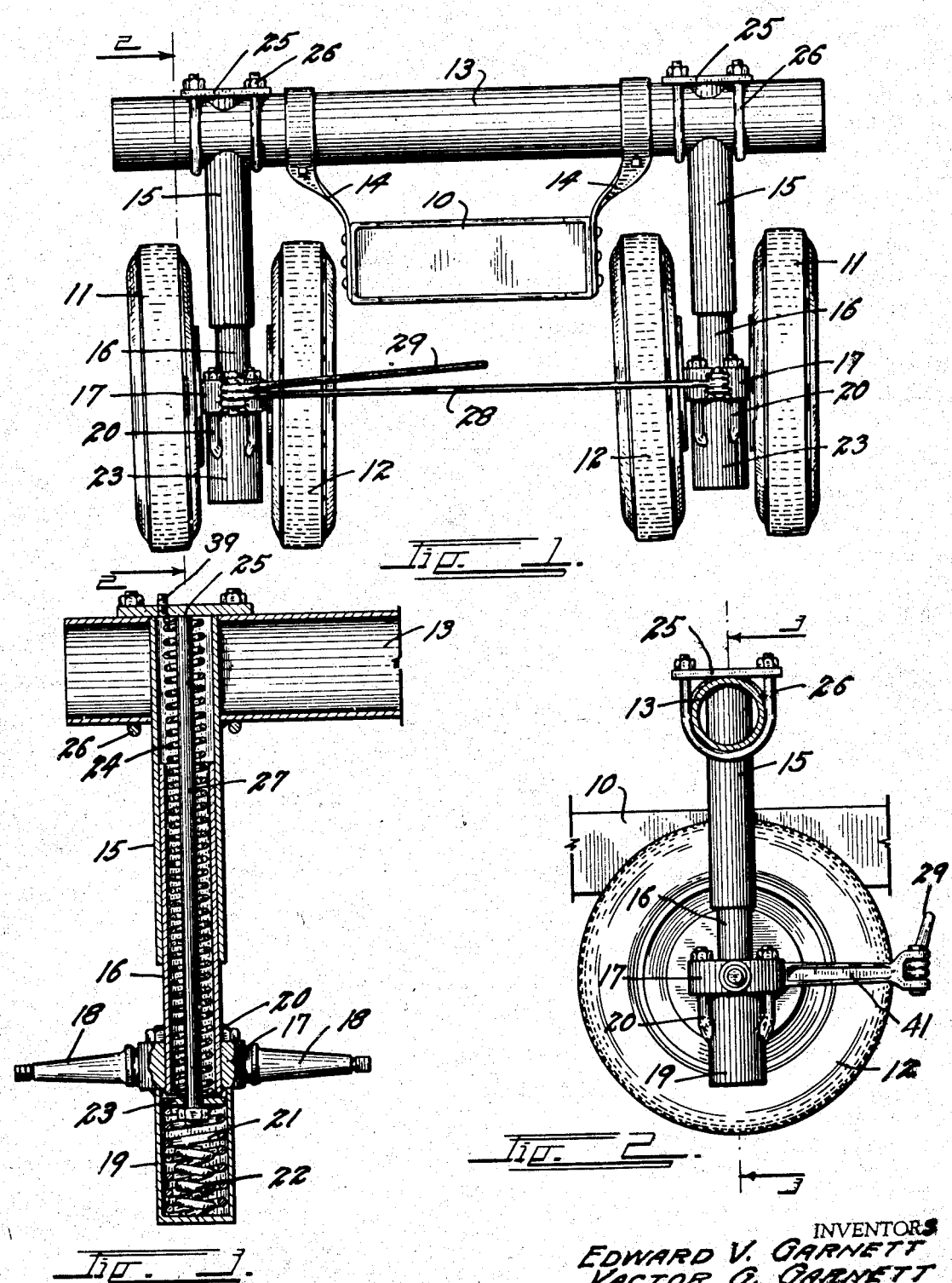
INVENTORS
EDWARD V. GARNETT
VACTOR G. GARNETT
BY
ATTORNEY.

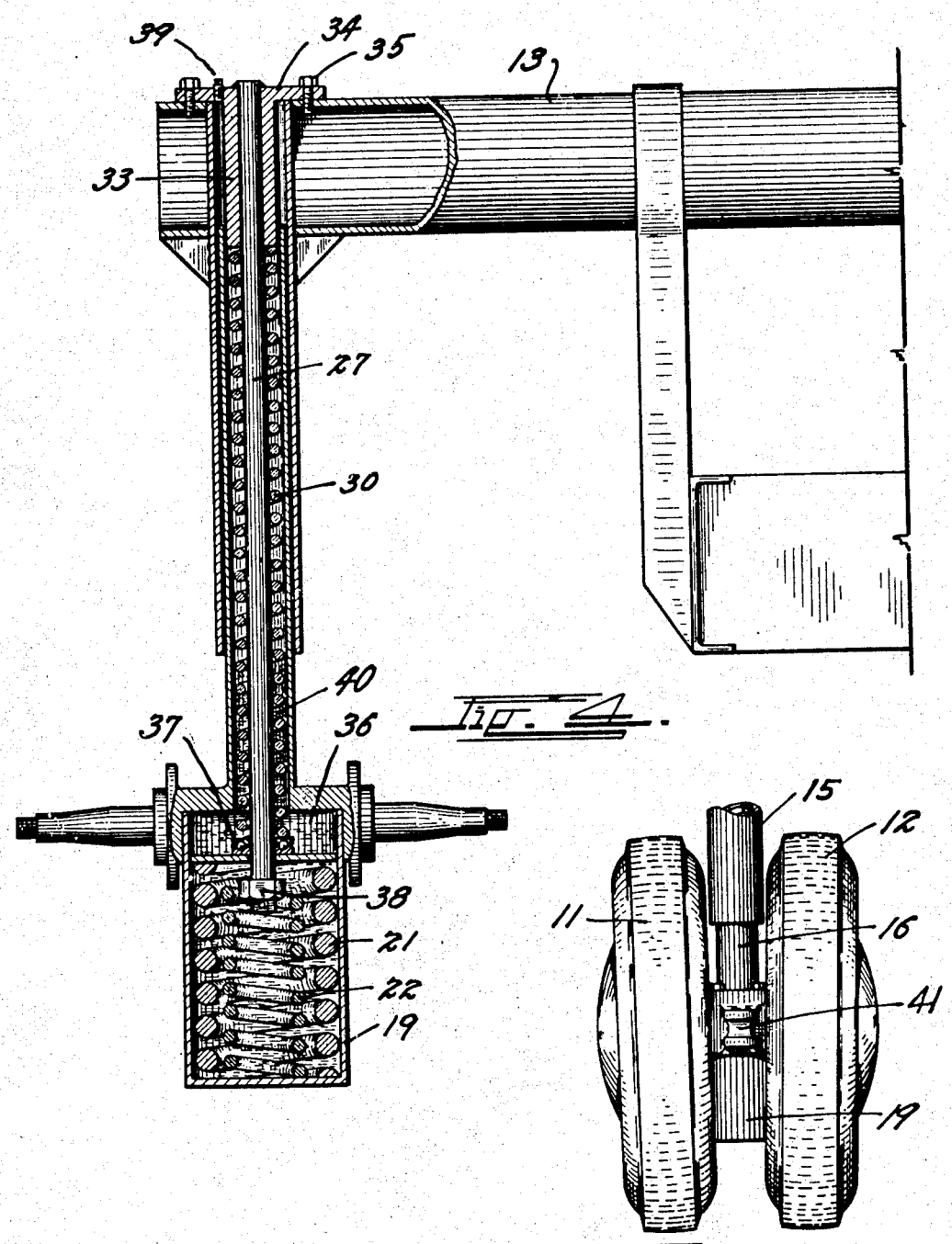

Patented Mar. 14, 1939

2,150,322

UNITED STATES PATENT OFFICE 2,150,322

DUAL WHEEL SPRING MOUNTING

Vactor G. Garnett and Edward V. Garnett, Denver, Colo.

Application November 2, 1937, Serial No. 172,336

8 Claims. (Cl. 280—96.2)

This invention relates to a wheel mounting for vehicles, such as trucks, busses, tractors, etc.

The principal object of the invention is to provide a wheel mounting, more particularly a front wheel mounting for dual wheels in which the bending strains, uneven tire loading, etc., of the usual long cantilever axle are eliminated.

Another object of the invention is to pivot a pair of dual front wheels between the wheels so that the load will be equally distributed on both wheels and so that a short lever arm is used for turning and guiding the wheels.

A further object is to provide a spring arrangement which can be mounted in the limited space available between a pair of dual wheels and which will support the vehicle on a light spring when traveling with a light load or empty, and upon a heavy spring when loaded, and to provide means for automatically increasing the strength of the spring as the load thereon increases.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a front view of a pair of front dual wheels illustrating the invention applied thereto.

Fig. 2 is a vertical section taken on the line 2—2, Fig. 1.

Fig. 3 is a vertical section taken on the line 3—3, Fig. 2, with the wheels removed.

Fig. 4 is a vertical section illustrating a different adaptation of the invention.

Fig. 5 is a front view of a pair of dual wheels with the invention in place therebetween.

In the drawings a typical vehicle frame is indicated at 10, the outer wheel of two pairs of dual wheels is indicated at 11, and the inner wheel at 12.

In applying the invention, a cross beam 13 is extended transversely across the vehicle frame. This beam may be of any desired construction, but it has been found that a tubular beam, such as illustrated, is the most satisfactory. The frame 10 is suspended from the beam by any suitable structural members, such as the hangers 14.

A vertical outer tube 15 extends downwardly from adjacent each extremity of the beam 13. The outer tubes 15 pass through the beam and are permanently welded or otherwise secured thereto. An inner tube 16 is telescopically fitted into the lower extremity of each outer tube 15. The tubes 16 carry axle blocks 17 permanently secured to their lower extremities. A pair of oppositely extending axle studs 18 extend from each axle block for mounting the wheels 11 and 12.

A spring cup 19 is bolted to the bottom of each axle block 17 by means of suitable suspension bolts and nuts 20. Within each spring cup is an outer intermediate spring 21 and a shorter inner, heavy spring 22. The outer spring 21 supports a spring plate 23 which rides freely thereon. A long comparatively light spring 24 is compressed between the spring plate 23 and a top plate 25 covering the upper end of the tube 15. A central spring guide rod 27 extends downwardly from each plate 25, through the spring 24 and through the spring plate 23. The length of the telescoping travel of the inner tube 16 into the outer tube 15 is so proportioned to the compression limit of the spring 24 that the latter may be compressed completely closed before the tubes are completely telescoped.

The plates 25 may be bolted or otherwise secured to the beam 13 in any desired manner. As illustrated, they are secured by means of U-bolts 26 partially surrounding the beam 13. These plates 25 carry the entire pressure of the spring 24.

A steering arm 41 extends from each axle block 17 for receiving a tie rod 28 and a steering rod 29. The tie rods connect the opposite arms 41, and the rod 29 connects to the usual steering wheel mechanism of the vehicle.

It can be readily seen that this construction avoids the long cantilever axle, usually necessary for mounting a pair of dual wheels upon the front axle of a vehicle, and also avoids the unequal loading of the wheels due to flexing of the usual long lever axle.

In the present invention, the load is carried directly between the wheels and the latter are mounted upon oppositely extending short axle studs which counterbalance each other so that bending strains are reduced and the wheels can be easily guided and easily held in the road.

It can also be seen that when there is no load upon the truck, the truck weight will be carried entirely upon the light springs 24 so that the usual rough riding caused by an empty or light truck will be avoided. As the load on the truck increases, the spring 24 compresses and its resistance to compression constantly increases until it is completely closed and cannot be further compressed. The load is then transmitted through closed spring 24 to the spring plate 23, thence to the spring 21. Should the load be still further increased, the spring 21 will be compressed until the plate 23 rests upon the heavy spring 22. Thus, giving maximum springing qualities under both light and heavy loads.

The spring 24 is confined between the tube 16 and the rod 27 so that it can be completely compressed without buckling. It is preferred to have the springs 24 and 21 so proportioned in strength that the latter will start to compress before the former reaches its fully closed condition to avoid any sudden jolt when passing from one spring to the other.

Fig. 4 illustrates a slightly different assembly involving the same principle. In this form the upper spring, shown at 30, snugly engages a guide rod 27 so that the spring cannot move laterally to contact the sides of the tube. The spring rests at the top against a relatively long guide sleeve 33 which extends downwardly into the upper extremity of the inner tube. This eliminates any possibility of the spring catching or dragging on the upper extremity of the inner tube. The sleeve 33 extends downwardly from a flange 34 bolted to the cross beam as shown at 35.

In this form the spring cup is fitted into a depression 36 in the bottom of the axle block. This allows longer springs to be used without decreasing the road clearance of the cup and also acts to seal the latter against oil leakage. A thrust bearing 37 is provided to absorb the thrust between the spring 30 and the spring plate. The lower extremity of the guide rod carries a nut 38 which prevents the entire assembly from falling apart should the truck frame be lifted and which also acts to transmit rebound to the opening 30.

Fig. 5 illustrates how closely the dual wheels may be placed together with this form of spring suspension. The wheels illustrated are of the "Budd" type with convex discs which snugly enclose the spring cup with a minimum of separation between the wheels.

The entire structure is oil tight and a filler plug 39 is provided by means of which it may be partially filled with oil as indicated at 40. The oil level may rise in the inner tube to the top thereof. Thus, all of the springs and all friction parts are operating in a bath of oil.

When the tubes are filled with oil, the spring plate 23 acts as a piston or plunger since the oil must pass through or around this plate before the latter can move in either direction. This acts as a shock absorber or damper upon the spring action. The oil which splashes from the inner tube will work down between the two tubes lubricating their contacting surfaces.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. Means for mounting a pair of dual wheels on a vehicle comprising: an axle block positioned between said wheels; axle studs extending oppositely from said axle block for receiving said wheels; an inner tube projecting upward from said axle block; a downwardly extending outer tube secured to said vehicle and telescopically receiving said inner tube; a spring cup secured to and extending downwardly from said axle block; a spring in said spring cup; a spring plate supported by said spring; a second spring extending from said spring plate upwardly through said axle block and through both the inner and outer tubes; and means for receiving the up thrust of said second spring.

2. Means for mounting a pair of dual wheels on a vehicle comprising: an axle block positioned between said wheels; axle studs extending oppositely outward from said axle block for receiving said wheels; an inner tube projecting upward from said axle block; a downwardly extending outer tube secured to said vehicle and telescopically receiving said inner tube; a spring cup secured to and extending downwardly from said axle block; a spring in said spring cup; a spring plate supported by said spring; a second spring extending from said spring plate upwardly through said axle block and through both the inner and outer tubes; and means for receiving the up thrust of said second spring, said second spring being more easily compressed than the first spring.

3. Means for mounting a pair of dual wheels on a vehicle comprising: an axle block positioned between said wheels; axle studs extending oppositely outward from said exle block for receiving said wheels; an inner tube projecting upward from said axle block; a downwardly extending outer tube secured to said vehicle and telescopically receiving said inner tube; a spring cup secured to and extending downwardly from said axle block; a spring in said spring cup; a spring plate supported by said spring; a second spring extending from said spring plate upwardly through said axle block and through both the inner and outer tubes; means for receiving the up thrust of said second spring; and a guide member extending downwardly through said second one spring and through said spring plate.

4. Means for mounting a pair of dual wheels on a vehicle comprising: an axle block positioned between said wheels; axle studs extending oppositely outward from said axle block for receiving said wheels; an inner tube projecting upward from said axle block; a downwardly extending outer tube secured to said vehicle and telescopically receiving said inner tube; a spring cup secured to and extending downwardly from said axle block; a spring in said spring cup; a spring plate supported by said spring; a second spring extending from said spring plate upwardly through said axle block and through both the inner and outer tubes; means for receiving the up thrust of said second spring, said second spring being more easily compressed than the first spring; and a third spring positioned in said spring cup within said first spring, said third spring being heavier and shorter than the others.

5. Means for mounting a pair of dual wheels on a vehicle comprising: an axle block positioned between said wheels; axle studs extending oppositely outward from said axle block for receiving said wheels; an inner tube projecting upward from said axle block; a downwardly extending outer tube secured to said vehicle and telescopically receiving said inner tube; a spring cup secured to and extending downwardly from said axle block; a compression spring in said cup; and means for transmitting the weight of said vehicle to said spring.

6. Means for mounting a pair of dual wheels on a vehicle comprising: an axle block positioned between said wheels; axle studs extending oppositely outward from said axle block for receiving said wheels; an inner tube projecting upward from said axle block; a downwardly extending outer tube secured to said vehicle and telescopically receiving said inner tube; a spring cup secured to and extending downwardly from said axle block below the axis of said wheels; a compression spring positioned in said cup; and resilient means for transmitting the weight of said vehicle to said compression spring.

7. Means for mounting a pair of dual wheels on a vehicle comprising: an axle block positioned between said wheels; axle studs extending oppositely outward from said axle block for receiving said wheels; an inner tube projecting upward from said axle block; a downwardly extending outer tube secured to said vehicle and telescopically receiving said inner tube; a spring cup secured to and extending downwardly from said axle block below the axis of said wheels; a compression spring positioned in said cup; a second compression spring extending through both tubes supported by the first compression spring; and means for transmitting the weight of the vehicle to the second spring.

8. A dual wheel mounting for vehicles comprising: an axle member; a pair of wheel axles projecting oppositely outward from said member; a cylindrical spring cup fitted into a circular depression in the bottom of said member between said wheel axles; a vertical tube extending upwardly from said member and communicating therethrough with said spring cup; an outer tube secured to and extending downwardly from said vehicle about said inner tube; a vertical rod extending downward through both tubes and terminating within said spring cup, said rod being secured to said vehicle at its upper extremity; a first spring resting on the bottom of said cup; a spring plate supported by said spring, said rod passing through said plate; means on said rod for preventing the latter from withdrawing through said plate; and a helical spring surrounding said rod above said plate and transmitting the weight of the vehicle to said plate.

VACTOR G. GARNETT.
EDWARD V. GARNETT.